United States Patent
Xu et al.

(10) Patent No.: US 9,313,696 B2
(45) Date of Patent: *Apr. 12, 2016

(54) APPARATUS AND METHOD FOR X2 INTERFACE SETUP AND CELL SWITCHING IN MOBILE COMMUNICATION SYSTEM

(71) Applicant: Samsung Electronics Co., Ltd., Suwon-si, Gyeonggi-do (KR)

(72) Inventors: Lixiang Xu, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/276,514

(22) Filed: May 13, 2014

(65) Prior Publication Data

US 2014/0248881 A1 Sep. 4, 2014

Related U.S. Application Data

(63) Continuation of application No. 13/089,759, filed on Apr. 19, 2011, now Pat. No. 8,725,151.

(30) Foreign Application Priority Data

Apr. 28, 2010 (CN) .......................... 2010 1 0159944

(51) Int. Cl.
*H04W 36/00* (2009.01)
*H04W 84/04* (2009.01)
*H04W 92/20* (2009.01)

(52) U.S. Cl.
CPC ...... *H04W 36/0061* (2013.01); *H04W 36/0033* (2013.01); *H04W 84/045* (2013.01); *H04W 92/20* (2013.01)

(58) Field of Classification Search
USPC ........... 455/436, 437, 438, 442, 435.1, 435.2, 455/450, 422.1
See application file for complete search history.

(56) References Cited

U.S. PATENT DOCUMENTS 7,444,149 B2 10/2008 Prehofer
8,036,656 B2 10/2011 Jeong et al.
(Continued)

FOREIGN PATENT DOCUMENTS

CN 101505510 A 8/2009
CN 101600237 A 12/2009
(Continued)

OTHER PUBLICATIONS

Alcatel-Lucent; Handling of CSG for in-bound Mobility; 3GPP TGS-RAN WG3 #63bis; R3-090745; Mar. 23-26, 2009; Seoul, KR.
(Continued)

*Primary Examiner* — Jean Gelin
(74) *Attorney, Agent, or Firm* — Jefferson IP Law, LLP

(57) ABSTRACT

A method and an apparatus for setting up an X2 interface setup are provided. The method includes transmitting, by a first Base Station (BS), an X2 interface setup request to a second BS, wherein the X2 interface setup request comprises an access mode of a Closed Subscriber Group (CSG) supported by a cell in the first BS, and transmitting, by the second BS, an X2 interface response message to the first BS, wherein the X2 interface response message comprises the access mode of the CSG supported by the cell in the second BS.

24 Claims, 9 Drawing Sheets

(56) References Cited

U.S. PATENT DOCUMENTS

| | | |
|---|---|---|
| 8,335,199 B2 | 12/2012 | Mukherjee et al. |
| 8,380,201 B2 | 2/2013 | Takahashi et al. |
| 2006/0259928 A1 | 11/2006 | Di Serio et al. |
| 2008/0075059 A1 | 3/2008 | Kermoal et al. |
| 2008/0084849 A1 | 4/2008 | Wang et al. |
| 2008/0227447 A1 | 9/2008 | Jeong et al. |
| 2008/0267153 A1 | 10/2008 | Mukherjee et al. |
| 2008/0318596 A1* | 12/2008 | Tenny ........................ 455/456.2 |
| 2009/0047960 A1 | 2/2009 | Gunnarsson et al. |
| 2009/0253433 A1 | 10/2009 | Voyer et al. |
| 2010/0039987 A1 | 2/2010 | Hegde et al. |
| 2010/0046476 A1* | 2/2010 | Qiu .............................. 370/331 |
| 2010/0112980 A1 | 5/2010 | Horn et al. |
| 2010/0157944 A1* | 6/2010 | Horn ................. H04W 36/0005 370/331 |
| 2010/0208693 A1* | 8/2010 | Centonza ..................... 370/331 |
| 2010/0210268 A1 | 8/2010 | Lim et al. |
| 2010/0296448 A1* | 11/2010 | Vainikka et al. ............. 370/328 |
| 2010/0297955 A1* | 11/2010 | Marinier ........... H04W 36/0061 455/73 |
| 2010/0329205 A1 | 12/2010 | Bi et al. |
| 2011/0038431 A1* | 2/2011 | Frederiksen et al. ......... 375/259 |
| 2011/0092214 A1 | 4/2011 | Iwamura et al. |
| 2011/0111745 A1* | 5/2011 | Li ........................ H04W 8/005 455/422.1 |
| 2011/0130143 A1* | 6/2011 | Mori et al. ..................... 455/436 |
| 2011/0165878 A1 | 7/2011 | Nylander et al. |
| 2011/0183676 A1* | 7/2011 | Lee ................... H04W 36/0072 455/438 |
| 2011/0199970 A1* | 8/2011 | Tiwari ........................... 370/328 |
| 2011/0237258 A1* | 9/2011 | Nylander et al. ............. 455/437 |
| 2011/0269460 A1 | 11/2011 | Dalsgaard et al. |
| 2011/0286429 A1* | 11/2011 | Vikberg et al. ................ 370/331 |
| 2012/0009901 A1 | 1/2012 | Kim et al. |
| 2012/0015652 A1 | 1/2012 | Jung et al. |
| 2012/0021725 A1 | 1/2012 | Rune |
| 2012/0106488 A1* | 5/2012 | Nylander et al. ............. 370/329 |
| 2012/0115459 A1* | 5/2012 | Deng ................ H04W 36/0094 455/422.1 |
| 2012/0122460 A1 | 5/2012 | Dalsgaard et al. |
| 2012/0220301 A1 | 8/2012 | Gupta |
| 2012/0244903 A1* | 9/2012 | Fong ...................... H04W 8/20 455/517 |

FOREIGN PATENT DOCUMENTS

| | | |
|---|---|---|
| CN | 101600238 A | 12/2009 |
| CN | 102202361 A | 9/2011 |
| JP | 2011-087089 A | 4/2011 |
| WO | 2010/010800 A2 | 1/2010 |
| WO | 2010/019443 A2 | 2/2010 |
| WO | 2010/078270 A2 | 7/2010 |
| WO | 2011/116694 A1 | 9/2011 |

OTHER PUBLICATIONS

3GPP; 3rd Generation Partnership Project; Technical Specification Group Radio Access Network; Evolved Universal Terrestrial Radio Access Network (E-UTRAN); X2 application protocol (X2AP) (Release 9); 3GPP TS 36.423; V9.2.0; Mar. 2010.

Ericsson; QoS control at handover to hybrid cell; 3GPP TSG-RAN WG3 #65-bis; R3-092459; Oct. 12-15, 2009; Miyazaki, Japan.

* cited by examiner

APPARATUS AND METHOD FOR X2 INTERFACE SETUP AND CELL SWITCHING IN MOBILE COMMUNICATION SYSTEM

CROSS-REFERENCE TO RELATED APPLICATION(S)

This application is a continuation application of a prior application Ser. No. 13/089,759, filed on Apr. 19, 2011, which claimed the benefit under 35 U.S.C. §119(a) of a Chinese patent application filed in the Chinese Intellectual Property Office on Apr. 28, 2010 and assigned Serial No. 201010159944.5, the entire disclosure of which is hereby incorporated by reference.

BACKGROUND OF THE INVENTION

1. Field of the Invention

The present invention relates to mobile communication technologies. More particularly, the present invention relates to an X2 interface setup method and a cell switching method in a mobile communication system.

2. Description of the Related Art

Along with recent developments of mobile communication technologies, a System Architecture Evolution (SAE) system has been widely used. More specifically, the SAE system includes an Evolved Universal Terrestrial Radio Access Network (E-UTRAN) and a core network.

FIG. 1 is a diagram illustrating an SAE system architecture according to the related art. A Base Station (BS) under the SAE system belongs to the E-UTRAN 110, and is responsible for providing User Equipment (UE) with a radio interface for accessing the SAE system. A Mobile Management Entity (MME) and a user plane entity (i.e., a Serving GateWay (S-GW)) 150 belong to the core network, and are connected with the BS under the SAE system through an S1 interface. Here, it is possible that the MME and the S-GW 150 are located in the same physical entity. FIG. 1 illustrates an example in which the MME and the S-GW 150 are located in the same physical entity, which is denoted as MME/S-GW. More specifically, the MME is responsible for managing a session context and/or a mobile context of the UE and saving security-related-information of a user, and the S-GW provides a user plane function.

Referring to FIG. 1, the BS under the SAE system includes a home BS 130 (e.g., a Home enhanced Node B (HeNB) or Home Node B (HNB)) and an ordinary macro BS 120 (e.g., enhanced Node B (eNB)). More specifically, the home BS 130 is used for a family and can be applied to places such as a university and/or a company, and is a plug-and-play type. That is, the HeNB is the home BS 130 applied to a long term evolution system and is connected with a gateway 140 of the home BS 130 through the S1 interface, and the gateway 140 of the home BS 130 is connected with the MME/S-GW 150 through the S1 interface. The HeNB may also be directly connected with the MME/S-GW 150 without the gateway of the BS. The HNB is the home BS 130 applied to a Universal Mobile Telecommunications System (UMTS) system and is connected with the gateway of the BS through an Iuh interface, and the gateway of the BS is connected with a Serving GPRS Support Node (SGSN) through the Iuh interface. Typically, the home BS 130 has a limit for an accessed UE, i.e., only the UE having an authority for accessing the home BS 130 can access the home BS 130, which is different from the ordinary macro BS 120. For example, regarding the user's family, only a member of the user's family or another member permitted by this family can access the home BS 130 of the family. Regarding a company, only a staff of the company and a cooperation partner permitted by this company can have access.

Typically, a group of home BSs having the same access user group (e.g., the home BSs used for the same company) is denoted as a Closed Subscriber Group (CSG). There is a unique IDentifier (ID) for each CSG, and the CSG ID is broadcasted in broadcast information of the home BS. In the related art, in order for the home BS to provide increased coverage, three access modes, which respectively are a Closed mode, a Hybrid mode and an Open mode, are defined for a cell of the home BS. The three access modes are respectively described in more detail below.

If the access mode of the cell of the home BS is the Closed mode, only a particular user, i.e., a user having a subscription with an operator, can access the cell of the home BS. A supported CSG ID is broadcasted in the cell of the home BS. Typically, the cell of this home BS in which the CSG ID is broadcasted and the access mode, which is the Closed mode, is denoted as a CSG cell. That is, the CSG cell denotes a closed-mode cell which supports a CSG function. If the access mode of the cell of the home BS is the Hybrid mode, the cell is denoted as a Hybrid cell. It is also required to broadcast the supported CSG ID in the Hybrid cell. Any of the users can access this Hybrid cell, but the member that belongs to the CSG supported by this Hybrid cell, i.e., the user already having a subscription with the operator, can gain a better service. That is, in the event that the Hybrid cell has a limited resource, firstly the member that does not belong to this home BS is switched to another cell, or is provided with a service using a low Quality of Service (QoS). If the access mode of the home BS is the Open mode, the home BS is the same as a macro cell, i.e., any user is permitted to have access. Also, no CSG ID is allocated to the cell of the home BS, and no CSG ID is broadcasted. The cell of the home BS of the Open mode is no different from the ordinary macro BS, and is denoted as an Open cell hereinafter.

Typically, a list of the CSG ID which permits access of the UE is saved on both the UE and the MME. This list may be subscription information. When the user accesses the cell of the home BS, the UE and the MME perform access control. That is, if it is determined that the access mode of the cell of the target home BS to be accessed by the user is the Closed mode, the user is permitted to have access in the event that the CSG supported by the cell of the home BS belongs to the list of the CSG ID which permits access. If the access mode of the cell of the home BS is the Hybrid mode, the user is permitted to have access and it is determined that the user is the member of the home BS in the event that the CSG supported by the cell of the home BS belongs to the list of the CSG ID which permits access, and the user is permitted to have access and it is determined that the user is not the member of the home BS otherwise.

Typically, a situation in which the UE moves from a home BS to another home BS, and particularly in which the UE moves from among multiple home BSs which belong to the same CSG, frequently occurs. With respect to this situation, handover based on the S1 interface (which is also denoted as a S1 handover) and handover based on an X2 interface (which is also denoted as an X2 handover) are the most common measures. More specifically, being compared with the X2 handover, the S1 handover has shortcomings such as frequent signaling interaction and/or core network requirements. A specific X2 handover procedure is as follows. When the UE of a connected mode moves from an eNB1 to another eNB2, if there is an X2 interface between the two eNBs, the eNB1 transmits a message to the eNB2 and the eNB2 prepares a resource. Thereafter, the eNB1 notifies a new configuration of a target cell to the UE, and the UE is synchronized with the target cell and transmits a message to notify the target cell. The BS in which the target cell is located, i.e., the eNB2, transmits a message to the MME after receiving the notification from the UE, so that the MME switches a downlink data tunnel from a source cell to the target cell.

It can be found that the X2 interface handover procedure in the related art is completely performed with respect to the macro BS eNB. The main reason for this is that in a system structure, which is illustrated in FIG. 1, there is an X2 interface between the macro BSs and there is no X2 interface between the home BSs. Therefore, the UE does not move between the home BSs.

SUMMARY OF THE INVENTION

Aspects of the present invention are to address at least the above-mentioned problems and/or disadvantages and to provide at least the advantages described below. Accordingly, an aspect of the present invention is to provide an apparatus and method for performing a handover between home Base Stations (BSs) in a mobile communication system.

Another aspect of the present invention is to provide an apparatus and method for performing a handover between home BSs using an X2 interface in a mobile communication system.

Another aspect of the present invention is to provide an apparatus and method for establishing an X2 interface between home BSs in a mobile communication system.

In accordance with an aspect of the present invention a method for setting up an X2 interface in a mobile communication system is provided. The method includes transmitting, by a first Base Station (BS), an X2 interface setup request to a second BS, wherein the X2 interface setup request comprises an access mode of a Closed Subscriber Group (CSG) supported by a cell in the first BS, and transmitting, by the second BS, an X2 interface response message to the first BS, wherein the X2 interface response message comprises the access mode of the CSG supported by the cell in the second BS.

In accordance with another aspect of the present invention a method for cell switching in a mobile communication system is provided. The method includes determining, by a source BS, whether to permit a handover of a User Equipment (UE) based on access mode of a target BS, transmitting, by the source BS, a handover request to the target BS, wherein the handover request comprises a group member state indication of the UE, and transmitting, by the target BS, a handover response to the source BS.

In accordance with still another aspect of the present invention an apparatus for a BS in a mobile communication system is provided. The apparatus includes a communication unit for transmitting an X2 interface setup request to a second BS, wherein the X2 interface setup request comprises an access mode of a CSG supported by a cell in the first BS, and for receiving an X2 interface response message from the second BS, wherein the X2 interface response message comprises the access mode of the CSG supported by the cell on the second BS, and a storage unit for storing the access mode of the CSG supported by the cell in the second BS.

In accordance with yet another aspect of the present invention an apparatus for a BS in a mobile communication system is provided. The apparatus includes a controller for determining whether to permit a handover of an UE based on access mode of a target BS, a communication unit for transmitting a handover request to the target BS, wherein the handover request comprises a group member state indication of the UE, and for receiving a handover response from the target BS.

In accordance with a further aspect of the present invention an apparatus for a BS in a mobile communication system is provided. The apparatus includes a communication unit for receiving a handover request comprising a CSG IDentifier (ID) supported by the target cell which is reported from the UE, and a controller for determining whether the CSG ID included in the handover request is consistent with the CSG ID supported by the target cell before transmitting the access request, wherein the communication unit transmits the access request to a Mobile Management Entity (MME) when the CSG IDs are consistent, and transmits a handover failure message to the source BS when the CSG IDs are not consistent.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for purposes of illustration only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention provide a home Base Station (BS) entity involved in Closed Subscriber Group (CSG) principles. An example of the home BS includes a Home enhanced Node B (HeNB). It should be understood that technical solutions according to the exemplary embodiments of the present invention are also applicable to a macro BS in which the CSG is defined. For example, if a cell of the macro BS is also defined with the CSG and can also be divided into a CSG cell, a Hybrid cell and an Open cell according to an access mode, the CSG cell, the Hybrid cell and the Open cell, which are described in more detail below, can be the cells applied to the macro BS.

Figure 2:
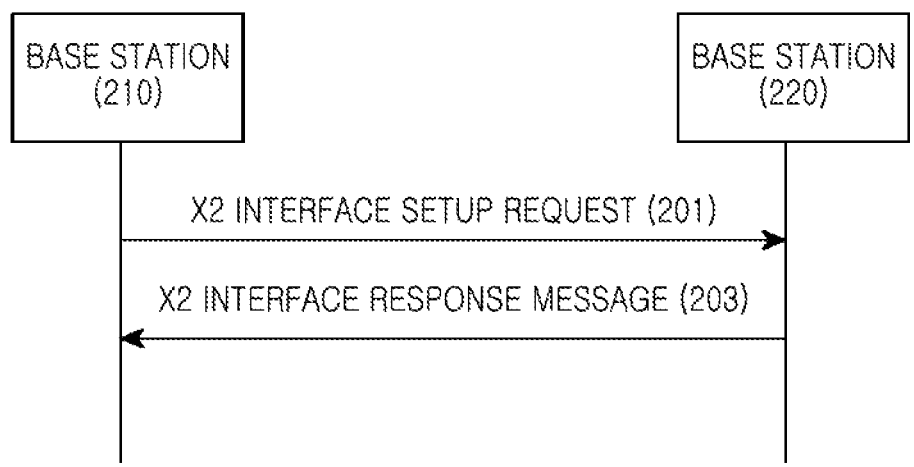
FIG. 2 is a diagram illustrating a procedure for setting up an X2 interface according to an exemplary embodiment of the present invention.

FIG. 2 is a diagram illustrating a procedure for setting up an X2 interface according to an exemplary embodiment of the present invention. The procedure is applied to a scenario in which the X2 interface is established between the home BSs which belongs to the same CSG, and is also applicable to a scenario in which the X2 interface is established between the home BS and the macro BS or a scenario in which the X2 interface is established between the macro BSs.

Referring to FIG. 2, in step 201, a BS 210 transmits an X2 interface setup request to a BS 220. Here, if the BS 210 supports a CSG function, the access mode of the CSG supported by the cell on the BS 210 is included in the X2 interface setup request. More specifically, the access mode of the CSG can be implemented as at least one of a Closed mode, a Hybrid mode and an Open mode as described in the related art. If the access mode of the CSG is the Closed mode or the Hybrid mode, a CSG IDentifier (ID) supported by the cell on the BS 210 can be further included in the X2 interface setup request. If the access mode of the CSG is the Open mode, there is no need to include the CSG ID supported by the cell on the BS 210 in the X2 interface setup request since there is no CSG ID for the cell of the Open mode, and it is sufficient to include only the access mode of the CSG supported by the cell on the BS 210, i.e., the Open mode. In an exemplary implementation, the X2 interface setup request can further include an identifier of the BS 210, and/or information of the cell on the BS 210. Optionally, the request can include at least one of information of an adjacent cell of the BS 210, and information of a Mobile Management Entity (MME) pool to which the BS 210 belongs.

In step 203, the BS 220 transmits an X2 interface response message to the BS 210. Here, if the BS 220 supports a CSG function, the access mode of the CSG supported by the cell on the BS 220 is included in the X2 interface response message. More specifically, the access mode of the CSG can be implemented as at least one of the Closed mode, the Hybrid mode and the Open mode as described above with respect to the related art. If the access mode of the CSG is the Closed mode or the Hybrid mode, the CSG ID supported by the cell on the BS 220 can be further included in the X2 interface response message. If the access mode of the CSG is the Open mode, there is no need to include the CSG ID supported by the cell on the BS 220 in the X2 interface response since there is no CSG ID for the cell of the Open mode, and it is sufficient to include only the access mode of the CSG supported by the cell on the BS 220, i.e., the Open mode. In an exemplary implementation, the X2 interface response message can further include an identifier of the BS 220, and/or information of the cell on the BS 220. Optionally, the message can include at least one of information of an adjacent cell of the BS 220, and information of an MME pool to which the BS 220 belongs.

Figure 1:
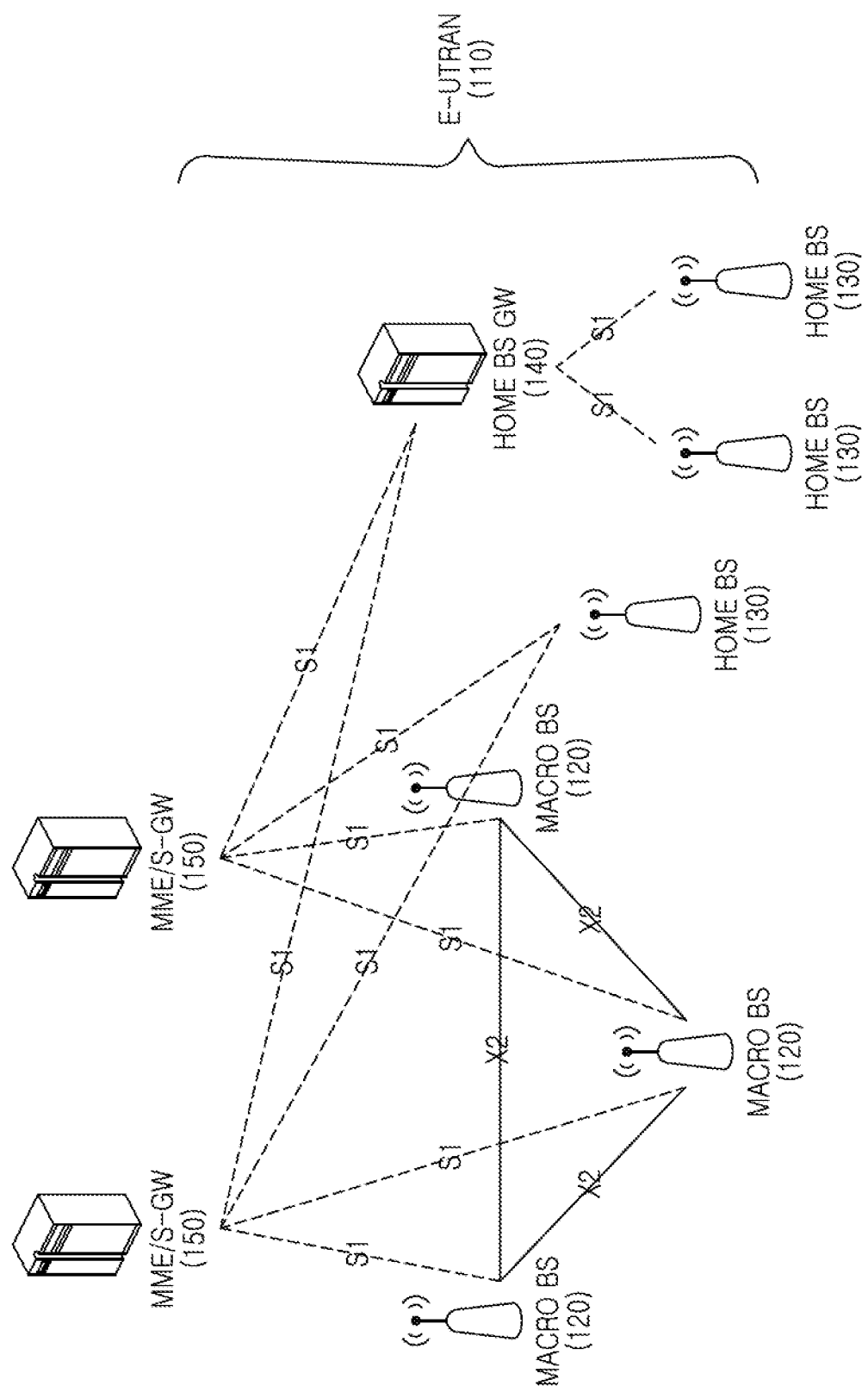
FIG. 1 is a diagram illustrating a System Architecture Evolution (SAE) system architecture according to the related art.

The X2 interface setup method provided according to an exemplary embodiment of the present invention is implemented as described above. According to the setup method, the system structure illustrated in FIG. 1 can be updated as illustrated in FIG. 3.

Figure 3:
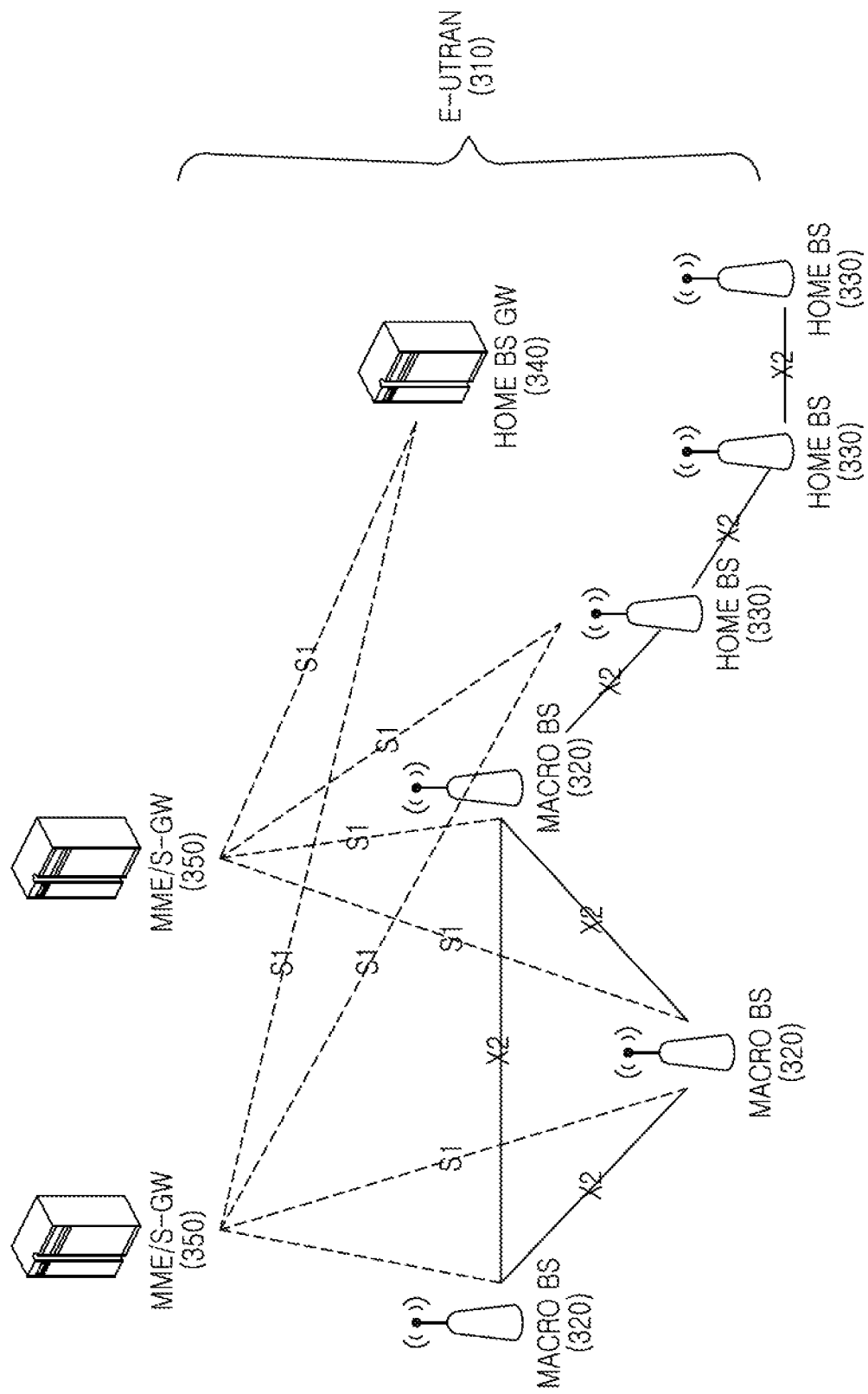
FIG. 3 is a diagram illustrating an SAE system architecture according to an exemplary embodiment of the present invention.

FIG. 3 is a diagram illustrating a System Architecture Evolution (SAE) system according to an exemplary embodiment of the present invention.

Referring to FIG. 3, the SAE system belongs to an Evolved Universal Terrestrial Radio Access Network (E-UTRAN) 310. In the SAE system, a home BS 330 is connected with a gateway 340 of the home BS 330 through S1 interface, and the gateway 340 of the home BS 330 is connected with a MME/Special GateWay (S-GW) 350 through S1 interface. A macro BS 320 is connected with the MME/S-GW 350 through S1 interface. More particularly, the X2 interface is set up between macro BSs 320 and X2 interface is set up between home BSs 330.

A cell switching method in the mobile communication system according to an exemplary embodiment of the present invention is described below with reference to FIG. 4.

Figure 4:
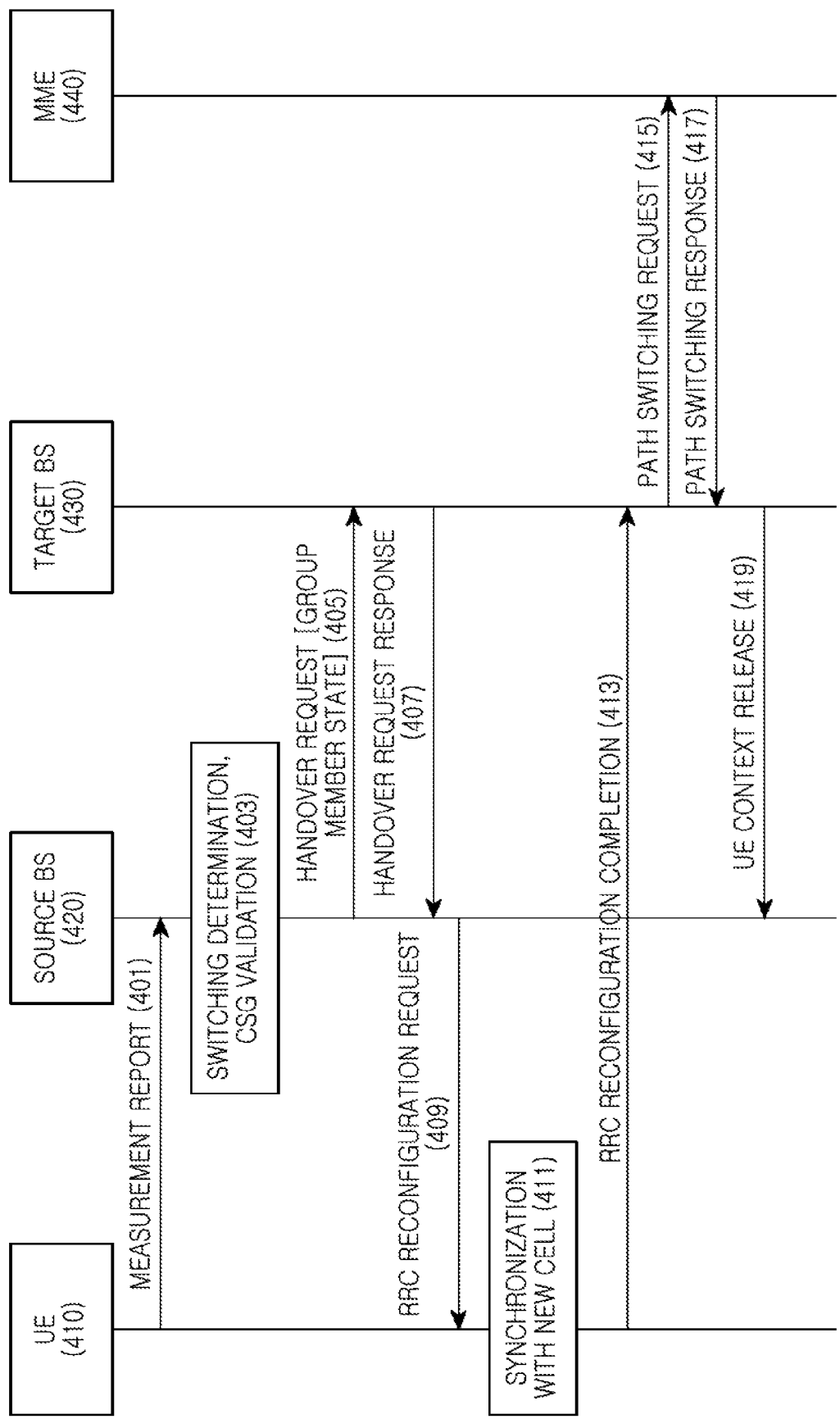
FIG. 4 is a diagram illustrating a procedure of a User Equipment (UE) accessing a source cell required to handover to a target cell according to an exemplary embodiment of the present invention.

FIG. 4 is a diagram illustrating a procedure of a User Equipment (UE) accessing a source cell required to handover to a target cell according to an exemplary embodiment of the present invention. The exemplary embodiment of the present invention is applied to the system structure illustrated in FIG. 3. It is assumed herein that a source cell on a source BS and a target cell on a target BS are both cells supporting a CSG function and correspond to the same CSG, i.e., a CSG ID broadcasted in the source cell is the same as that in the target cell. Also, an X2 interface has been established in accordance with the method illustrated in FIG. 2 by the source BS and the target BS.

Referring to FIG. 4, in step 401, the UE 410 transmits a measurement report to the source BS 420 in which the source cell is located. Here, the UE 410 transmits the measurement report according to a configuration of the source cell. For example, if it is specified in the configuration of the source cell that the UE 410 transmits the measurement report periodically, the UE 410 transmits the measurement report in a preset time interval. If it is specified in the configuration of the source cell that the measurement report is triggered by an event, i.e., is transmitted when a certain condition is met, the UE 410 transmits the measurement report when the event is satisfied. Here, a physical layer identifier corresponding to the target cell is included in the measurement report, i.e., the source BS 420 knows the target cell to which the UE 410 is to be switched. The source cell and the target cell both may be cells supporting the CSG function. Thus, the CSG identifier and a group member state indication of the UE 410 can be further included in the measurement report. More specifically, if the group member state indication is set as Member, it is indicated that the UE 410 is a user member that belongs to the Hybrid cell.

In step 403, the source BS 420 determines whether it is permitted to handover the UE 410 to the target cell. If the handover is permitted, the source BS 420 transmits a handover request to the target BS 430 in step 405. Otherwise, the source BS 420 refuses to handover the UE 410 to the target cell and terminates the procedure. The source BS 420 can make the determination according to an algorithm for radio resource management and the measurement report in step 403. More specifically, the source BS 420 determines whether a signal of the target cell meets a handover condition defined by the algorithm for radio resource management. If it is determined that the signal of the target cell meets the handover condition, the source BS 420 determines whether to handover the user to the target cell. The source cell in the source BS 420 and the target cell in the target BS 430 both may be cells supporting the CSG function and correspond to the same CSG. Also, when the X2 interface between the source BS 420 and the target BS 430 is established by the method illustrated in FIG. 2, the source BS 420 can obtain information of the CSG supported by the cell in the target BS 430, e.g., the access mode of the CSG. Also, in the event that the access mode is the Closed mode or the Hybrid mode, the information of the CSG can further include the CSG ID supported by the cell in the target BS 430. Thus, when determining that the signal of the target cell meets the handover condition defined by the algorithm for radio resource management, the source BS 420 can also perform a CSG detection function, i.e., determine whether the CSG ID supported by the target cell is consistent with that reported in the measurement report by the UE 410. If it is determined that the CSG ID is consistent, the source BS 420 permits the handover of the UE 410 to the target cell Otherwise, the source BS 420 refuse to handover the UE 410 to the target cell if the target cell is the CSG cell.

In step 405, the source BS 420 transmits a handover request to the target BS 430. Here, at least one of an indication of an X2 signaling context allocated to the UE 410 by the source BS 420, an indication by a core network, an indication of an S1 signaling context allocated to the UE 410 by the core network, an identifier of the target cell, encryption information and an encryption capability of the UE 410, information of a Radio Resource Control (RRC) context and information of an E-UTRAN Radio Access Bearer (E-RAB) may be included in the handover request. The information of the RRC context includes an access layer configuration and an identifier allocated to the UE 410 by the source cell, and the information of the E-RAB includes Quality of Service (QoS) information and user plane tunnel information of the core network.

When the X2 interface is established by the method illustrated in FIG. 2, the source BS 420 obtains the information of the CSG supported by the cell in the target BS 430. Thus, when the source BS 420 transmits a handover request to the target BS 430 in step 405, if the source BS 420 knows that the target cell and the source cell support the same CSG according to the obtained information of the CSG supported by the cell in the target BS 430, the target cell should also permit the UE 410 to have access in the event that the access mode of the source cell is the Closed mode and the UE 410 has already been connected to the source cell (which means that the source cell permits this UE 410 to have access), since the target cell and the source cell support the same CSG. Therefore, if the access mode of the source cell is the Closed mode, the source BS 420 transmits the handover request to the target BS 430. Thereafter, after receiving the handover request, the target BS 430 can then determine that the UE 410 is permitted to access the target cell.

In the event that the access mode of the source cell is "Hybrid", the group member state indication of the UE 410 can be further included in the handover request. More specifically, the group member state indication can be set as "being a group member" or "not a group member". Here, since the target cell supports the same CSG as the source cell, it can be derived that the UE 410 has the same group member state at the source cell and the target cell. The group member state indication of the UE 410 has already been saved in the source BS 420. Accordingly, it is sufficient to have the saved group member state indication of the UE 410 included in the handover request. According to an exemplary embodiment of the present invention, the group member state indication can be arranged only in the event that the UE 410 is the group member, i.e., the handover request does not include the group member state indication in the event that the UE 410 is not the group member. That is, if the group member state indication is included by the handover request, it is indicated that the UE 410 is the group member. Otherwise, it is indicated that the UE 410 is not the group member.

In step 407, the target BS 430 transmits a handover request response to the source BS 420. Here, the handover request response includes an indication of an X2 signaling context allocated to the UE 410 by the target BS 430, and/or an RRC message to be transmitted to the UE 410. The RRC message to be transmitted to the UE 410 is transparently transmitted to the source BS 420, and the source BS 420 transfers the message to the UE 410. If required, the handover request response also includes General Data Transfer Platform (GTP) tunnel information for data transfer.

In step 409, the source BS 420 transmits an RRC reconfiguration request to the UE 410. Here, the RRC reconfiguration request includes the "RRC message to be transmitted to the UE 410" transmitted to the source BS 420 by the target BS 430 in step 407. The "RRC message to be transmitted to the UE 410" is transmitted to the source BS 420 by the target BS 430, and then transmitted to the UE 410 by the source BS 420. More specifically, the RRC message to be transmitted to the UE 410 can include a Cell Radio Network Temporary Identifier (C-RNTI) allocated to the UE 410 by the target cell, and/or encryption information of the target BS 430, and may further include information of an allocated random access channel.

In step 411, the UE 410 performs synchronization with the target cell. In step 413, the UE 410 transmits an RRC reconfiguration completion message to the target BS 430 after completing the synchronization.

In step 415, the target BS 430 transmits a path switching request message to the MME 440, to notify the UE 410 that it has already been switched to a new cell, i.e., the target cell. Here, an indication of an S1 signaling context allocated to the UE 410 by the target BS 430 and tunnel information for downlink data reception are included in the path switching request message.

In step 417, the MME 440 transmits a path switching response message to the target BS 430. Here, an indication of an S1 signaling context allocated to the UE 410 by the MME 440 and/or tunnel information for uplink data are included in the path switching response message, and if necessary, encryption information can also be included.

In step 419, the target BS 430 transmits a UE 410 context release message to the source BS 420, to instruct the source BS 420 that the context of the UE 410 can be released.

The X2 handover process is implemented as described above.

The above description is provided by taking the source BS and the target BS corresponding to the same CSG as an example. If the source BS and the target BS each correspond to distinct CSGs and the source BS does not save information of whether the UE can access the target cell, the core network needs to participate in the CSG access control.

Figure 5:
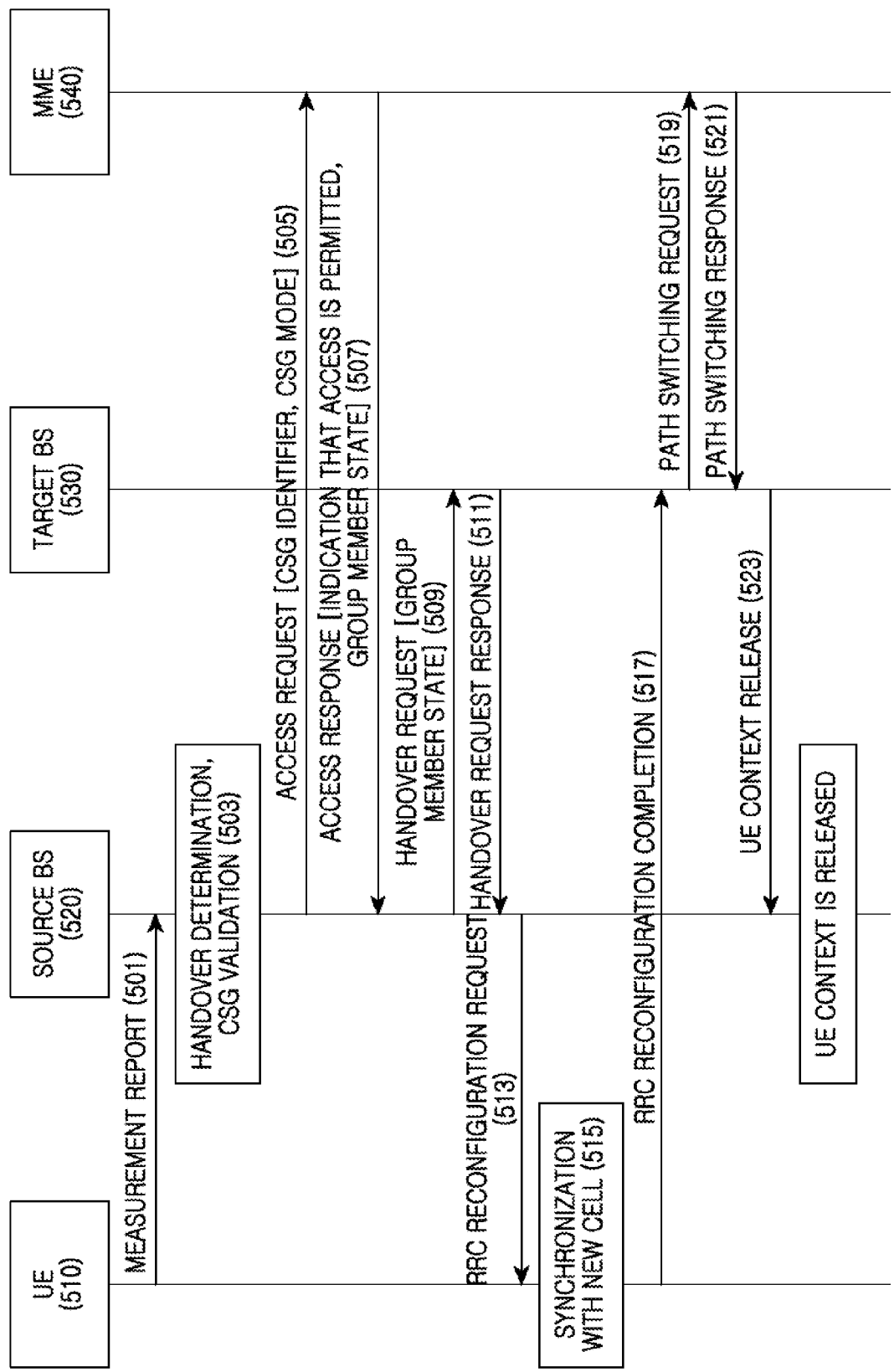
FIG. 5 is a diagram illustrating a procedure of a UE accessing a source cell required to switch to a target cell according to an exemplary embodiment of the present invention.

FIG. 5 is a diagram illustrating a procedure of a UE accessing a source cell required to switch to a target cell according to an exemplary embodiment of the present invention. The exemplary embodiment of the present invention is applied to the system structure illustrated in FIG. 3. Here, an X2 interface is established in accordance with the method illustrated in FIG. 2 between the source BS 520 and the target BS 530. More specifically, the source BS 520 and the target BS 530 can be the home BS, and can also be the ordinary macro BS supporting a CSG function.

Referring to FIG. 5, in step 501, the UE 510 transmits a measurement report to the source BS 520 in which a source cell is located. Here, the UE 510 transmits the measurement report according to the configuration of the source cell. For example, if it is specified in the configuration of the source cell that the UE 510 transmits the measurement report periodically, the UE 510 transmits the measurement report in a preset time interval. If it is specified in the configuration of the source cell that the measurement report is triggered by an event, i.e., transmitted when a certain condition is met, the UE 510 transmits the measurement report when the event is satisfied. Here, a physical layer identifier corresponding to the target cell is included in the measurement report, i.e., the source BS 520 knows the target cell to which the UE 510 is to be switched. The source cell and the target cell both may be cells supporting the CSG function. Thus, the CSG identifier and a group member state indication of the UE 510 can be further included in the measurement report. More specifically, if the group member state indication is set as Member, it is indicated that the UE 510 is a user member that belongs to the Hybrid cell.

In step 503, the source BS 520 determines whether it is permitted to handover the UE 510 to the target cell. If the handover is permitted, the source BS 520 transmits an access request to the MME 540 in step 505. Otherwise, the source BS 520 refuses to handover the UE 510 to the target cell and terminates the current procedure. More specifically, the source BS 520 can make the determination according to an algorithm for radio resource management and the measurement report in step 503. That is, the source BS 520 determines whether a signal of the target cell meets a handover condition defined by the algorithm for radio resource management. If it is determined that the signal of the target cell meets the handover condition, the source BS 520 determines whether to handover the user to the target cell. The source cell in the source BS 520 and the target cell in the target BS 530 both may be cells supporting the CSG function and correspond to the same CSG. Also, when an X2 interface between the source BS 520 and the target BS 530 is established by the method illustrated in FIG. 2, the source BS 520 can obtain information of the CSG supported by the cell in the target BS 530, e.g., the access mode of the CSG. Also, in the event that the access mode is the Closed mode or the Hybrid mode, the information of the CSG can further include the CSG ID supported by the cell in the target BS 530. Thus, when determining that the signal of the target cell meets the handover condition defined by the algorithm for radio resource management, the source BS 520 can also perform a CSG detection function, i.e., determine whether the CSG ID supported by the target cell is consistent with that reported in the measurement report by the UE 510. If it is determined that the CSG ID supported by the target cell is consistent with that reported in the measurement report by the UE 510, the source BS 520 permits the handover of the UE 510 to the target cell. Otherwise, the source BS 520 refuses to handover the UE 510 to the target cell if the target cell is the CSG cell.

In step 505, the source BS 520 determines that the target cell and the source cell do not support the same CSG, and then transmits an access request to the MME 540 if the target cell is a cell having a CSG capability. In an exemplary embodiment of the present invention, in accordance with the method illustrated in FIG. 2, the source BS 520 knows that the cell in the target BS 530 supports the CSG when establishing the X2 interface with the target BS 530. Thus, the source BS 520 can easily determine whether the target cell and the source cell support the same CSG according to the CSG information that is known. If it is determined that the target cell and the source cell support the same CSG, the source BS 520 operates in accordance with the procedure illustrated in FIG. 4. Otherwise, the source BS 520 executes an operation of transmitting the access request to the MME 540. It should be noted that, if the target cell does not support the CSG function, the core network does not need to perform a CSG access determination and processing is directly performed in accordance with the method in the related art. Here, the access request can include the CSG ID supported by the target cell, the access mode and an identifier of the UE 510.

In step 507, the MME 540 controls access of the UE 510 according to the CSG ID supported by the target cell, the access mode and subscription information of the UE 510, and thereafter, transmits an access response to the source BS 520. Here, if the target cell is the CSG cell, the access response includes an indication of whether the UE 510 is permitted to have access. Alternatively, in the event that the UE 510 is permitted to have access, a success access response which indicates that access to the target cell is permitted is transmitted. In the event that the UE 510 is not permitted to have access, a failure access response, which indicates that access to the target cell is not permitted, is transmitted. If the target cell is the Hybrid cell, the MME 540 determines whether the UE 510 is a group user member of the CSG supported by the target cell. In this case, the access response message can include a state indication of whether the UE 510 is the group member of the Hybrid cell.

In step 509, the source BS 520 determines whether switching the UE 510 to the target cell is permitted according to the indication of whether the UE 510 is permitted to have access which is included in the access response message. If it is determined that access is permitted, the source BS 520 transmits the handover request to the target BS 530. Otherwise, the source BS 520 refuses the user to have access and terminates the procedure. Here, at least one of an indication of an X2 signaling context allocated to the UE 510 by the source BS 520, an indication by the core network, an indication of an S1 signaling context allocated to the UE 510 by the core network, an identifier of the target cell, encryption information and an encryption capability of the UE 510, information of an RRC context and information of an E-RAB are included in the handover request.

If an access mode of the target cell is the Closed mode, the source BS 520 may refuse to switch the user to the target cell in the event that the MME 540 instructs that the UE 510 is not permitted to access the target cell, and the source BS 520 transmits the handover request to the target BS 530 in the event that the MME 540 instructs that the UE 510 is permitted to access the target cell. In this case, the handover request can further include an indication that the UE 510 is permitted to have access, i.e., the UE 510 is permitted to access the CSG supported by the target cell. This indication can be explicitly set as an information element that access is permitted, or be implicit, which denotes that the MME 540 permits the UE 510 to have access if the source BS 520 has transmitted the handover request.

If the access mode of the target cell is the Hybrid cell, any of the users is permitted to access the target cell. Thus, the source BS 520 transmits the handover request to the target BS 530. In this case, the handover request can further include the group member state indication of the UE 510 at the target cell. More specifically, the group member state indication of the UE 510 can be set as "a group member", i.e., the UE 510 is the user member of the CSG supported by the target cell. Alternatively, the group member state indication of the UE 510 can be set as "not a group member", i.e., the UE 510 is not the user member of the CSG supported by the target cell.

In step 511, the target BS 530 transmits a handover request response to the source BS 520. Here, the handover request response includes an indication of an X2 signaling context allocated to the UE 510 by the target BS 530, and/or an RRC message to be transmitted to the UE 510. More specifically, the RRC message to be transmitted to the UE 510 is transparently transmitted to the source BS 520, and the source BS 520 transfers this message to the UE 510. If required, the handover request response also includes General Data Transfer Platform (GTP) tunnel information for data transfer.

In step 513, the source BS 520 transmits an RRC reconfiguration request to the UE 510. Here, the RRC reconfiguration request includes the "RRC message to be transmitted to the UE 510" transmitted to the source BS 520 by the target BS 530 in step 507. The "RRC message to be transmitted to the UE 510" is transmitted to the source BS 520 by the target BS 530, and then transmitted to the UE 510 by the source BS 520. More specifically, the RRC message to be transmitted to the UE 510 can include a C-RNTI allocated to the UE 510 by the target cell, and/or encryption information of the target BS 530, and may further include information of an allocated random access channel.

In step 515, the UE 510 performs synchronization with the target cell. In step 517, the UE 510 transmits an RRC reconfiguration completion message to the target BS 530 after completing the synchronization.

In step 519, the target BS 530 transmits a path switching request message to the MME 540, to notify the UE 510 that it has already been switched to a new cell, i.e., the target cell. Here, an indication of an S1 signaling context allocated to the UE 510 by the target BS 530 and tunnel information for downlink data reception are included in the path switching request message.

In step 521, the MME 540 transmits a path switching response message to the target BS 530. Here, an indication of an S1 signaling context allocated to the UE 510 by the MME 540 and/or tunnel information for uplink data are included in the path switching response message, and if necessary, encryption information can also be included.

In step 523 the target BS 530 transmits a UE 510 context release message to the source BS 520, to instruct the source BS 520 that the context of the UE 510 can be released.

The X2 handover process illustrated in FIG. 5 is implemented as described above.

It can be found that in the above procedure illustrated in FIG. 5, the source BS triggers the MME to perform the CSG access control, i.e., the access control by the MME is executed after the source BS has already determined to permit the UE to access the target cell. However, in this case, the target BS does not participate in the handover procedure. A procedure in which the target BS triggers the MME to perform the CSG access control is described below with reference to FIG. 6.

Figure 6:
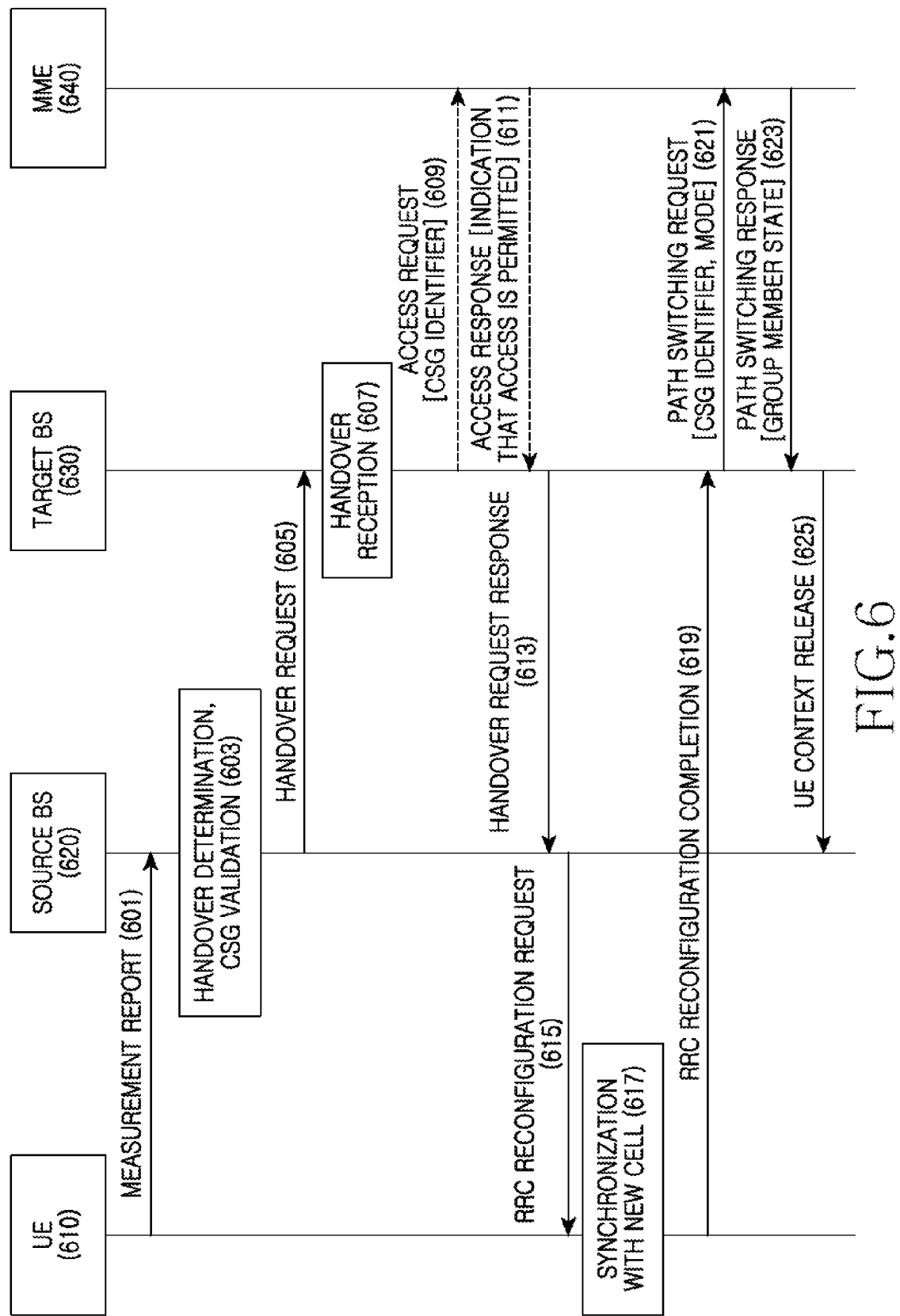
FIG. 6 is a diagram illustrating a procedure of a UE accessing a source cell in a source Base Station (BS) required to switch to a target cell in a target BS according to an exemplary embodiment of the present invention.

FIG. 6 is a diagram illustrating a procedure of a UE accessing a source cell in a source BS required to switch to a target cell in a target BS according to an exemplary embodiment of the present invention. The exemplary embodiment of the present invention is applied to the system structure illustrated in FIG. 3. Here, an X2 interface is established in accordance with the method illustrated in FIG. 2 between the source BS 620 and the target BS 620. The source BS 620 and the target BS 620 can be a home BS and an ordinary macro BS supporting a CSG function.

Referring to FIG. 6, in step 601, the UE 610 transmits a measurement report to the source BS 620 in which a source cell is located. Here, the UE 610 transmits the measurement report according to a configuration of the source cell. For example, if it is specified in the configuration of the source cell that the UE 610 transmits the measurement report periodically, the UE 610 transmits the measurement report in a preset time interval. If it is specified in the configuration of the source cell that the measurement report is triggered by an event, i.e., transmitted when a certain condition is met, the UE 610 transmits the measurement report when the event is satisfied. Here, a physical layer identifier corresponding to the target cell is included in the measurement report, i.e., the source BS 620 knows the target cell to which the UE 610 is to be switched. The source cell and the target cell both may be cells supporting the CSG function. Thus, the CSG identifier and a group member state indication of the UE 610 can be further included in the measurement report. More specifically, if the group member state indication is set as Member, it is indicated that the UE 610 is a user member that belongs to the Hybrid cell.

In step 603, the source BS 620 determines whether it is permitted to handover the UE 610 to the target cell. If the handover is permitted, the source BS 620 transmits a handover request to the target BS 620 in step 605. Otherwise, the source BS 620 refuses to handover the UE 610 to the target cell and terminates the procedure. The source BS 620 can make the determination according to an algorithm for radio resource management and the measurement report in step 603. More specifically, the source BS 620 determines whether a signal of the target cell meets a handover condition defined by the algorithm for radio resource management. If it is determined that the signal of the target cell meets the handover condition, the source BS 620 determines whether to handover the user to the target cell. The source cell in the source BS 620 and the target cell in the target BS 630 both may be cells supporting the CSG function and correspond to the same CSG. Also, when the X2 interface between the source BS 620 and the target BS 630 is established by the method illustrated in FIG. 2, the source BS 620 can obtain information of the CSG supported by the cell in the target BS 630, e.g., an access mode of the CSG. Also, in the event that the access mode is the Closed mode or the Hybrid mode, the information of the CSG can further include the CSG ID supported by the cell in the target BS 630. Thus, when determining that the signal of the target cell meets the handover condition defined by the algorithm for radio resource management, the source BS 620 can also perform a CSG detection function, i.e., determine whether the CSG ID supported by the target cell is consistent with that reported in the measurement report by the UE 610 If it is determined that the CSG ID supported by the target cell is consistent with that reported in the measurement report by the UE 610, the source BS 620 permits handover of the UE 610 to the target cell. Otherwise, the source BS 620 refuses to handover the UE 610 to the target cell if the target cell is the CSG cell.

In step 605, the source BS 620 transmits a handover request to the target BS 620. Here, an indication of an X2 signaling context allocated to the UE 610 by the source BS 620, an indication by the core network, an indication of an S1 signaling context allocated to the UE 610 by the core network, an identifier of the target cell, encryption information and an encryption capability of the UE 610, information of an RRC context and information of an E-RAB are included in the handover request.

It should be noted that if the source BS 620 has not obtain the information of the CSG supported by the cell of the target BS 620 when the X2 interface between the source BS 620 and the target BS 620 is established, the target BS 620 performs the CSG detection function, and steps of the CSG detection function, which are alternative steps of steps 601 to 605, are as follows. The UE 610 transmits the measurement report including the CSG ID supported by the target cell and the group member state indication of the UE 610 to the source BS 620. The source BS 620 transmits the handover request to the target BS 620. In addition to the above information, the handover request should also include the group member state indication of the UE 610 and the CSG ID which are reported in the measurement report by the UE 610. After the target BS 620 receives the handover request, the target BS 620 compares the CSG ID reported by the UE 610 and the CSG ID actually supported by the target cell. If the CSG IDs are not consistent with each other, it is indicated that the CSG ID reported by the UE 610 is forged. Then in the event that the access mode of the target cell is the Closed mode, the target BS 620 refuses to switch the UE 610 and transmits a handover failure message to the source BS 620. In the event that the access mode is the Hybrid mode, the target BS 620 permits to switch the UE 610, but regards the UE 610 as being not the group member of the CSG for processing. If the CSG IDs are consistent with each other, it is indicated that the CSG ID reported by the UE 610 is trustable.

In step 607, the target BS 620 receives the handover request. In step 609, if the target cell is the CSG cell, the target BS 620 transmits the access request to the MME 640. Here, the target BS 620 transmits the access request to the MME 640 to make the core network to determine whether the UE 610 is permitted to access the target cell. The access request includes the CSG ID supported by the target cell and the identifier of the UE 610. It should be noted that if the access mode of the target cell is the Hybrid mode, any of the users is permitted to access the target Hybrid cell. In this case, the transmitting, by the target BS 620, the access request to the MME 640 in step 609 and transmitting, by the MME 640, an access response to the target BS 620 in step 611 may be skipped, and an access control by the target BS 620 in step 613 may be directly performed.

In step 611, the MME 640 controls access of the UE 610 according to the CSG ID supported by the target cell and the subscription information of the UE 610, and thereafter, transmits the access response to the target BS 620. If the access mode of the target cell is the Closed mode, the MME 640 determines whether the UE 610 is permitted to access the target cell, i.e., the CSG supported by the target cell, according to the subscription information of the UE 610. In this case, the access response message can include an indication of whether the UE 610 is permitted to have access. Alternatively, in the event that the UE 610 is permitted to have access, a success access response which indicates that access to the target cell is permitted is transmitted, and in the event that the UE 610 is not permitted to have access, a failure access response, which indicates that access to the target cell is not permitted, is transmitted.

In step 613, if the UE 610 is permitted to access the target cell, the target BS 620 performs the access control of the resource according to E-RAB QoS information included by the handover request in step 605, and transmits the handover request response to the source BS 620. Here, the access control in step 607 relies on whether the physical resource in the target BS 620 can meet requirements of the E-RAB QoS, and a sufficient resource is allocated to the E-RAB, which is a current function of the target BS 620. More specifically, the above handover request response includes an indication of an X2 signaling context allocated to the UE 610 by the target BS 620, and/or an RRC message to be transmitted to the UE 610, and if required, also includes GTP tunnel information for data transfer.

In step 615, the source BS 620 transmits an RRC reconfiguration request to the UE 610. Here, the RRC reconfiguration request includes the "RRC message to be transmitted to the UE 610" transmitted to the source BS 620 by the target BS 630 in the above step 607. This "RRC message to be transmitted to the UE 610" is transmitted to the source BS 620 by the target BS 630, and then transmitted to the UE 610 by the source BS 620. More specifically, the RRC message to be transmitted to the UE 610 can include a C-RNTI allocated to the UE 610 by the target cell, and/or encryption information of the target BS 630, and may further include information of an allocated random access channel.

In step 617, the UE 610 performs synchronization with the target cell, and, in step 619, the UE 610 transmits an RRC reconfiguration completion message to the target BS 630 after completing the synchronization.

In step 621, the target BS 620 transmits the path switching request message to the MME 640, to notify the UE 610 that it has already been switched to a new cell, i.e., the target cell. Here, an indication of an S1 signaling context allocated to the UE 610 by the target BS 620 and tunnel information for downlink data reception are included in the path switching request message. The path switching request message may further include the access mode and the CSG ID supported by the target cell.

In step 623, the MME 640 transmits the path switching response message to the target BS 620. Here, an indication of an S1 signaling context allocated to the UE 610 by the MME 640 and/or tunnel information for uplink data are included in the path switching response message, and if necessary, encryption information can also be included. The group member state indication of the UE 610, i.e., indication of whether the UE 610 is the group member of the target cell, is also included in the path switching response message. That is, in step 623, the group member state indication can be set as "being a group member" or "not a group member", and can also be set as "being a group member" only. If no setting is made, the UE 610 is considered as being not the group member. Thus, the target BS 620 schedules the UE 610 according to the group member state indication of the UE 610.

It should be noted that the setting of the group state indication in step 623 is executed when the target cell is the Hybrid cell. The main reason for this is that any of the Hybrid cells permits the UE 610 to have access, but in the scheduling, the UE 610 can be scheduled based on two roles, i.e., as the group member or not as the group member. If the target cell is not the Hybrid cell, e.g., is the Closed cell, it is possible that the path switching response message does not include the group member state indication of the UE 610, which can be similar to step 415 illustrated in FIG. 4.

In step 625, the target BS 620 transmits the UE 610 context release message to the source BS 620, to instruct the source BS 620 that the context of the UE 610 can be released.

The X2 handover process illustrated in FIG. 5 is implemented as described above.

It can be found that in the above procedure illustrated in FIG. 5, it is the source BS that triggers the MME to perform the CSG access control, and in the above procedure illustrated in FIG. 6, it is the target BS that triggers the MME to perform the CSG access control. In an exemplary implementation, the source BS and the target BS may respectively trigger the MME to perform the access control, i.e., the source BS triggers the MME to perform the access control of the CSG cell and the target BS triggers the MME to perform the access control of the Hybrid cell, which is describe in more detail below with reference to FIG. 7.

Figure 7:
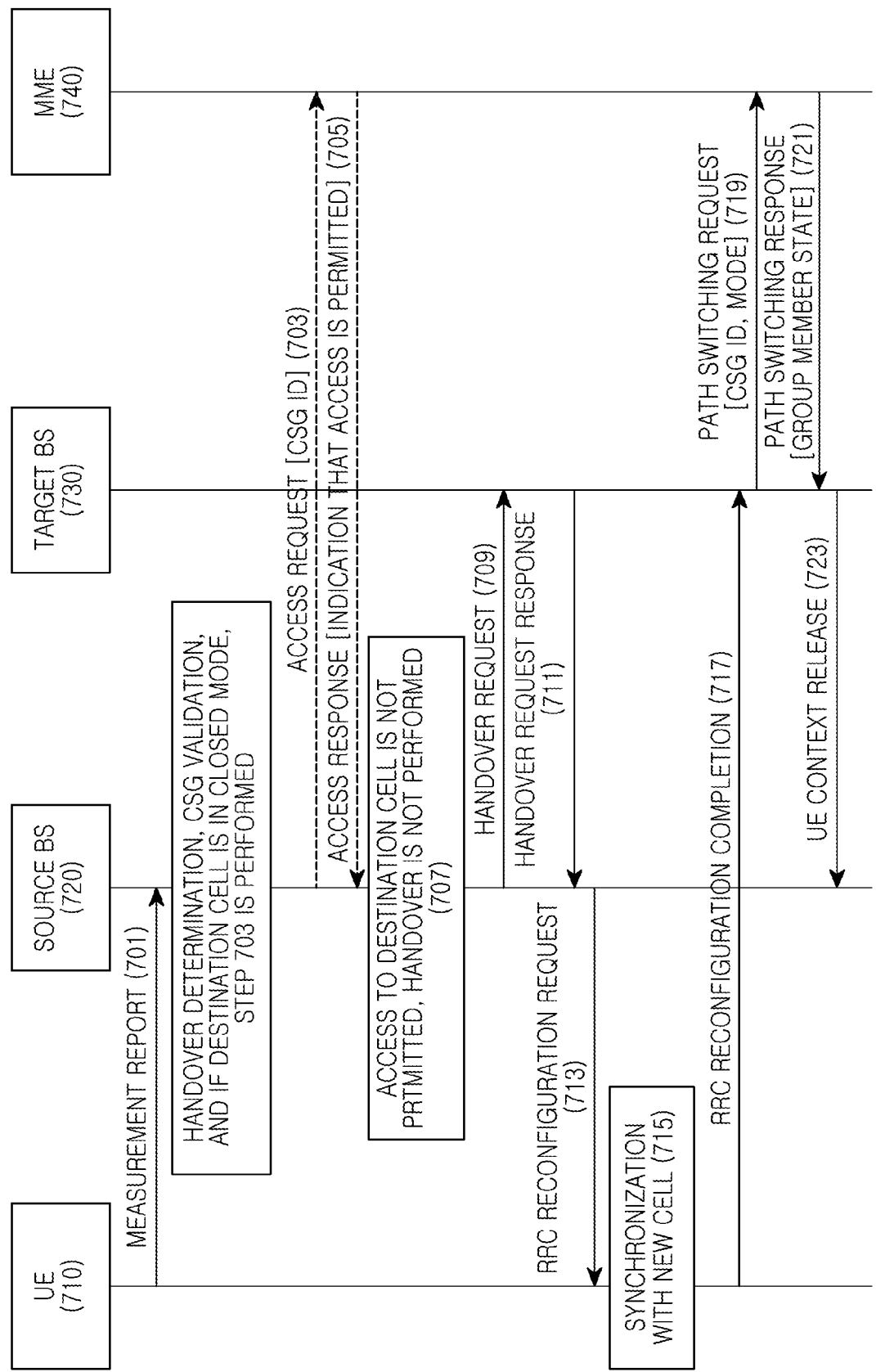
FIG. 7 is a diagram illustrating a procedure of a UE accessing a source cell in a source BS required to switch to a target cell in a target BS according to an exemplary embodiment of the present invention.

FIG. 7 is a diagram illustrating a procedure of a UE accessing a source cell in a source BS required to switch to a target cell in a target BS according to an exemplary embodiment of the present invention. The exemplary embodiment of the present invention is applied to the system structure illustrated in FIG. 3. Here, the X2 interface is established in accordance with the method illustrated in FIG. 2 between the source BS and the target BS 730. More specifically, the source BS 720 and the target BS 730 include a home BS and an ordinary macro BS supporting a CSG function.

Referring to FIG. 7, in step 701, the UE 710 transmits a measurement report to the source BS 720 in which the source cell is located. Here, the UE 710 transmits the measurement report according to the configuration of the source cell. For example, if it is specified in a configuration of the source cell that the UE 710 transmits the measurement report periodically, the UE 710 transmits the measurement report in a preset time interval. If it is specified in the configuration of the source cell that the measurement report is triggered by an event, i.e., is transmitted when a certain condition is met, the UE 710 transmits the measurement report when the event is satisfied. Here, a physical layer identifier corresponding to the target cell is included in the measurement report, i.e., the source BS 720 knows the target cell to which the UE 710 is to be switched. The source cell and the target cell both may be cells supporting the CSG function. Thus, the CSG identifier and a group member state indication of the UE 710 can be further included in the measurement report. If the group member state indication is set as Member, it is indicated that the UE 710 is a user member that belongs to the Hybrid cell.

In step 703, the source BS 720 determines whether it is permitted to handover the UE 710 to the target cell. If the handover is permitted, the source BS 720 determines that the target cell and the source cell do not support the same CSG in step 705. Otherwise, the source BS 720 refuses to handover the UE 710 to the target cell and terminates the current procedure. The source BS 720 can make the determination according to an algorithm for radio resource management and the measurement report in step 703. More specifically, the source BS 720 determines whether a signal of the target cell meets a handover condition defined by the algorithm for radio resource management. If it is determined that the signal of the target cell meets the handover condition, the source BS 720 determines whether to handover the user to the target cell. The source cell in the source BS 720 and the target cell in the target BS 730 are both cells supporting the CSG function and correspond to the same CSG. Also, when an X2 interface between the source BS 720 and the target BS 730 is established by the method illustrated in FIG. 2, the source BS 720 can obtain information of the CSG supported by the cell in the target BS 730, e.g., an access mode of the CSG. Also, in the event that the access mode is the Closed mode or the Hybrid mode, the information of the CSG can further include the CSG ID supported by the cell in the target BS 730. Thus, when determining that the signal of the target cell meets the handover condition defined by the algorithm for radio resource management, the source BS 720 can also perform a CSG detection function, i.e., determine whether the CSG ID supported by the target cell is consistent with that reported in the measurement report by the UE 710 If it is determined that the CSG ID is consistent, the source BS 720 permits handover of the UE 710 to the target cell. Otherwise, the source BS 720 refuses to handover the UE 710 to the target cell if the target cell is the CSG cell.

In step 705, the source BS 720 determines that the target cell and the source cell do not support the same CSG, and the source BS 720 transmits the access request to the MME 740 if the target cell is the CSG cell. Here, the CSG ID supported by the target cell and the identifier of the UE 710 can be included in the access request.

It should be noted that if the access mode of the target cell is the Hybrid mode, any of the users is permitted to access the target Hybrid cell. In this case, the determining, by the source BS 720, as to whether the target cell and the source cell do not support the same CSG and the transmitting the access request to the MME 740 in steps 705 and the controlling of access of the UE 710 according to the CSG ID supported by the target cell and subscription information of the UE 710 in step 707 may be skipped, and an operation of transmitting the handover request to the target BS 730 in step 709 may be directly performed.

In step 707, an MME 740 controls access of the UE 710 according to the CSG ID supported by the target cell and the subscription information of the UE 710, and thereafter, transmits the access response message to the source BS 720. Here, the access response includes the indication of whether the UE 710 is permitted to have access. Alternatively, in the event that the UE 710 is permitted to have access, a success access response which indicates that access to the target cell is permitted is transmitted, and in the event that the UE 710 is not permitted to have access, a failure access response, which indicates that access to the target cell is not permitted, is transmitted.

In step 709, the source BS 720 determines whether it is permitted to switch the UE 710 to the target cell according to the indication of whether the UE 710 is permitted to have access which is included in access response message If it is determined that the source BS 720 the switching of the UE 710 to the target cell is permitted, the source BS 720 transmits the handover request to the target BS 730. Otherwise, the source BS 720 refuses the user to have access and terminates the current procedure. Here, if the target cell is the Hybrid cell, any of the users is permitted to access the target cell, i.e., the source BS 720 directly transmits the handover request to the target BS 730 in step 709. Here, an indication of an X2 signaling context allocated to the UE 710 by the source BS 720, an indication by the core network, an indication of an S1 signaling context allocated to the UE 710 by the core network, an identifier of the target cell, encryption information and an encryption capability of the UE 710, information of an RRC context and information of an E-RAB are included in the handover request.

In step 711, if the UE 710 is permitted to access the target cell, the target BS 720 performs the access control of the resource according to the E-RAB QoS information included by the handover request in step 709, and transmits the handover request response to the source BS 720. Here, the access control in Step 707 relies on whether a physical resource in the target BS 720 can meet requirements of the E-RAB QoS, and a sufficient resource is allocated to the E-RAB, which is a current function of the target BS 720. More specifically, the handover request response includes an indication of an X2 signaling context allocated to the UE 710 by the target BS 720, and/or an RRC message to be transmitted to the UE 710, and if required, also includes GTP tunnel information for data transfer.

In step 713, the source BS 720 transmits an RRC reconfiguration request to the UE 710. Here, the RRC reconfiguration request includes the "RRC message to be transmitted to the UE 710" transmitted to the source BS 720 by the target BS 730 in the above step 707. The "RRC message to be transmitted to the UE 710" is transmitted to the source BS 720 by the target BS 730, and then transmitted to the UE 710 by the source BS 720. More specifically, the RRC message to be transmitted to the UE 710 can include a C-RNTI allocated to the UE 710 by the target cell, and/or encryption information of the target BS 730, and may further include information of an allocated random access channel.

In step 715, the UE 710 performs synchronization with the target cell, and, in step 717, the UE 710 transmits an RRC reconfiguration completion message to the target BS 730 after completing the synchronization.

In step 719, the target BS 720 transmits the path switching request message to the MME 740, to notify the UE 710 that it has already been switched to a new cell, i.e., the target cell. Here, an indication of an S1 signaling context allocated to the UE 710 by the target BS 720 and tunnel information for downlink data reception are included in the path switching request message. The path switching request message can further include the access mode and the CSG ID supported by the target cell.

In step 721, the MME 740 transmits the path switching response message to the target BS 720. Here, an indication of an S1 signaling context allocated to the UE 710 by the MME 740 and/or tunnel information for uplink data are included in the path switching response message, and if necessary, encryption information can also be included. The group member state indication of the UE 710, i.e., whether the UE 710 is the group member of the target cell, is also included in the path switching response message. That is, the group member state indication can be set as "being a group member" or "not a group member", and can also be set as "being a group member" only. If no setting is made, the UE 710 is considered as being not the group member. Thus, the target BS 720 schedules the UE 710 according to the group member state indication of the UE 710.

It should be noted that the transmitting of the path switching response message by the MME 740 to the target BS 720 in step 721 is executed when the target cell is the Hybrid cell. The main reason for this is that any of the Hybrid cells permits the UE 710 to have access, but in the scheduling, the UE 710 can be scheduled based on two roles, i.e., as the group member or not as the group member. If the target cell is not the Hybrid cell, e.g., is the Closed cell, it is possible that the path switching response message does not include the group member state indication of the UE 710, which can specifically be similar to step 415 illustrated in FIG. 4.

In step 723, the target BS 720 transmits the UE 710 context release message to the source BS 720, to instruct the source BS 720 that the context of the UE 710 can be released.

Figure 8:
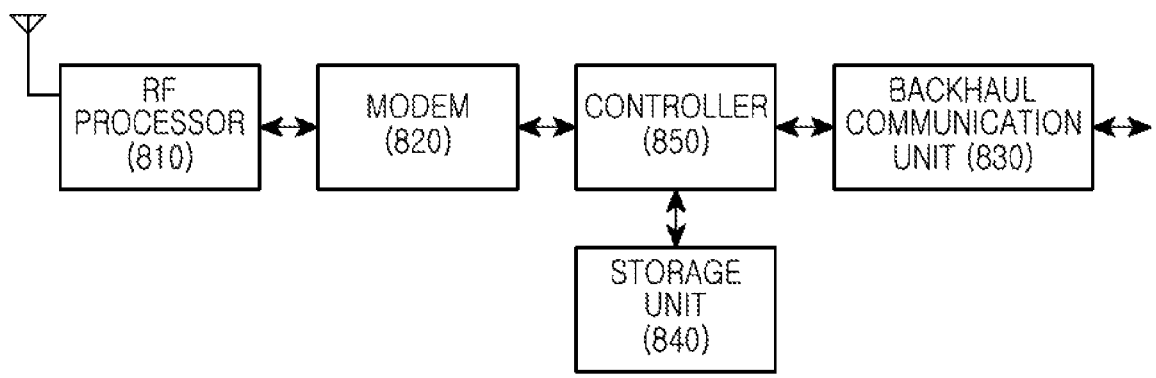
FIG. 8 is a block diagram of a BS in a mobile communication system according to an exemplary embodiment of the present invention.

FIG. 8 is a block diagram of a BS in a mobile communication system according to an exemplary embodiment of the present invention.

Referring to FIG. 8, the BS includes a Radio Frequency (RF) processor 810, a modem 820, a backhaul communication unit 830, a storage unit 840 and a controller 850.

The RF processor 810 performs functions, such as signal band conversion and amplification, to transmit and receive signals over a radio channel. That is, the RF processor 810 up-converts a baseband signal output from the modem 820 into the RF signal and transmits the RF signal over an antenna, and down-converts the RF signal received over the antenna into the baseband signal. Although not illustrated, for example, the RF processor 810 may include an amplifier, a mixer, an oscillator, a Digital to Analog Convertor (DAC), an Analog to Digital Convertor (ADC) and the like.

The modem 820 converts the baseband signal and a bit string according to a physical layer standard of the system. For example, to transmit data, the modem 820 generates complex symbols by encoding and modulating a transmit bit string, maps the complex symbols to subcarriers, and constitutes Orthogonal Frequency-Division Multiplexing (OFDM) symbols by applying Inverse Fast Fourier Transform (IFFT) and inserting a Cyclic Prefix (CP). When receiving data, the modem 820 splits the baseband signal output from the RF processor 810 into OFDM symbols, restores the signals mapped to the subcarriers using Fast Fourier Transform (FFT), and restores the receive bit string by demodulating and decoding the signals.

The backhaul communication unit 830 provides an interface for the BS to communicate with other entities (i.e., other BSs, an MME and the like). More specifically, the backhaul communication unit 830 converts the bit string transmitted by the BS into a physical signal, and converts the physical signal received at the BS into the bit string. The storage unit 840 stores program codes and system information required for the operations of the BS. The storage unit 840 provides stored data to the controller 850 upon a request from the controller 850.

The controller 850 controls the functions of the BS. For example, the controller 850 generates a transmit packet and a message and provides the modem 820 with the transmit packet and the message. The controller 850 also processes a receive packet and a message from the modem 820. More particularly, according to an exemplary embodiment of the present invention, the controller 850 controls a procedure to establish an X2 interface with another BS, a procedure for a handover of an UE from another BS to the BS and a procedure for a handover of a UE from the BS to another BS. For example, the controller 850 controls a procedure to establish an X2 as illustrated in FIG. 2. For example, the controller 850 controls a procedure for a handover as illustrated in FIG. 4 to FIG. 7.

The backhaul communication unit 830 transmits an X2 interface setup request to a second BS, and receives an X2 interface response message from the second BS. Herein, the X2 interface setup request comprises an access mode of a Closed Subscriber Group (CSG) supported by a cell on the first BS. The X2 interface response message comprises the access mode of the CSG supported by the cell on the second BS. The storage unit 840 stores the access mode of the CSG supported by the cell on the second BS.

For example, the controller 850 determines whether to permit a handover of an UE based on an access mode of a target BS, and the backhaul communication unit 830 transmits a handover request to the target BS and receives a handover response from the target BS. Herein, the handover request comprises a group member state indication of the UE.

For example, the backhaul communication unit 830 receives a handover request comprising a CSG ID supported by the target cell which is reported from the UE, and the controller 850 determines whether the CSG ID included in the handover request is consistent with the CSG ID supported by the target cell before transmitting access request. If the CSG IDs are consistent, the backhaul communication unit 830 transmits the access request to the MME. However, if the CSG IDs are not consistent, the backhaul communication unit 830 transmits a handover failure message to the source BS.

Figure 9:
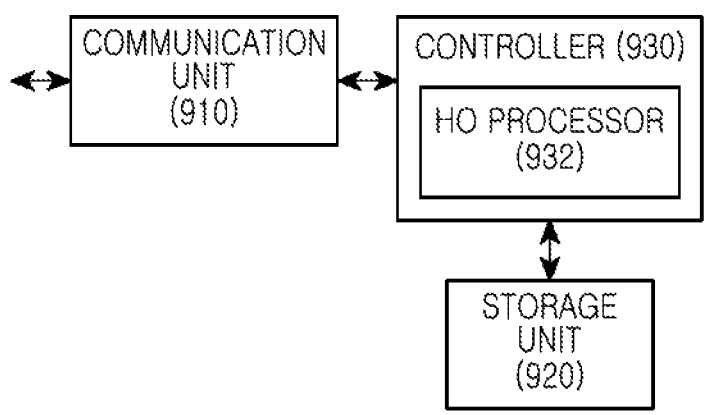
FIG. 9 is a block diagram of a Mobile Management Entity (MME) in a mobile communication system according to an exemplary embodiment of the present invention.

FIG. 9 is a block diagram of a MME in a mobile communication system according to an exemplary embodiment of the present invention.

Referring to FIG. 9, the MME includes a communication unit 910, a storage unit 920, and a controller 930.

The communication unit 910 provides an interface for a gateway to communicate with other entities (i.e., a BS and on the like). The storage unit 920 stores program codes and system information required for the operations of the gateway.

The controller 930 controls the functions of the gateway. For example, the controller 930 manages a traffic flow of at least one small BS connected to the gateway. More particularly, according to an exemplary embodiment of the present invention, a Handover (HO) processor 932 included in the controller 930 controls a procedure for handover of a UE performed between BSs connected to the MME. For example, the controller 930 controls a procedure for a handover as illustrated in FIG. 4 to FIG. 7.

According to the exemplary embodiments of the present invention, an access mode and a CSG ID supported by the cell at an opposite end can be known when an X2 interface is established between BSs. Thus, a BS can be facilitated in performing control on access of the UE when serving as a source BS.

Further, a target BS is not configured to request an MME to determine whether the UE can access the target BS after the UE has already been switched to the target BS. Thus, problems resulted from releasing the connection or handover the UE from the target BS to the source BS by an access network when access is not available can be avoided, and normal data reception by a user can be implemented.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for operating a base station (BS) in a mobile communication system, the method comprising:
    transmitting a setup request message to another BS, wherein the setup request message includes a closed subscriber group (CSG) identifier (ID) and neighbor information of the BS;
    receiving a setup response message from the another BS, wherein the setup response message includes a CSG ID and neighbor information of the another BS; and
    transmitting a handover request message to the another BS, wherein the handover request message includes a group membership state of a user equipment (UE).

2. A method for operating a base station (BS) in a mobile communication system, the method comprising:
    receiving a setup request message from another BS, wherein the setup request message comprises a closed subscriber group (CSG) identifier (ID) and neighbor information of the another BS;
    transmitting a setup response message to the another BS, wherein the setup response message comprises the CSG ID and neighbor information of the BS; and
    transmitting a handover request message to the another BS, wherein the handover request message includes a group membership state of a user equipment (UE).

3. A base station (BS) in a mobile communication system, the BS comprising:
    a communication unit configured to:
    receive an setup request message from another BS;
    transmit a setup response message to the another BS; and
    transmit a handover request message to the another BS,
    wherein the setup request message comprises a closed subscriber group (CSG) identifier (ID) and neighbor information of the another BS,
    wherein the setup response message comprises the CSG ID and neighbor information of the BS, and
    wherein the handover request message includes a group membership state of a user equipment (UE).

4. The method of claim 1, wherein the CSG ID is included in the setup request message if an access mode of the BS is one of a closed mode or a hybrid mode.

5. The method of claim 1, wherein the CSG ID is used to determine whether to allow a handover between the BS and the another BS.

6. The method of claim 2, wherein the CSG ID is included in the setup request message if an access mode of the BS is one of a closed mode or a hybrid mode.

7. The method of claim 2, wherein the CSG ID is used to determine whether to allow a handover between the BS and the another BS.

8. The BS of claim 3, wherein the CSG ID is included in the setup request message if an access mode of the BS is one of a closed mode or a hybrid mode.

9. The BS of claim 3, wherein the CSG ID is used to determine whether to allow a handover between the BS and the another BS.

10. A base station (BS) in a mobile communication system, the BS comprising:
    a communication unit configured to:
    transmit a setup request message from another BS,
    receive a setup response message to the another BS, and
    transmit a handover request message to the another BS,
    wherein the setup request message comprises a closed subscriber group (CSG) identifier (ID) and neighbor information of the another BS,
    wherein the setup response message comprises the CSG ID and neighbor information of the BS, and
    wherein the handover request message includes a group membership state of a user equipment (UE).

11. The BS of claim 10, wherein the CSG ID is included in the setup request message if an access mode of the BS is one of a closed mode or a hybrid mode.

12. The BS of claim 10, wherein the CSG ID is used to determine whether to allow a handover between the BS and the another BS.

13. A method for operating a base station (BS) in a mobile communication system, the method comprising:

transmitting a setup request message to another BS, wherein the setup request message includes a closed subscriber group (CSG) identifier (ID) and neighbor information of the BS;

receiving a setup response message from the another BS, wherein the setup response message includes a CSG ID and neighbor information of the another BS; and receiving a handover request message from the another BS, wherein the handover request message includes a group membership state of a user equipment (UE).

14. The method of claim 13, wherein the CSG ID is included in the setup request message if an access mode of the BS is one of a closed mode or a hybrid mode.

15. The method of claim 13, wherein the CSG ID is used to determine whether to allow a handover between the BS and the another BS.

16. A method for operating a base station (BS) in a mobile communication system, the method comprising:

receiving a setup request message from another BS, wherein the setup request message comprises a closed subscriber group (CSG) identifier (ID) and neighbor information of the another BS;

transmitting a setup response message to the another BS, wherein the setup response message comprises the CSG ID and neighbor information of the BS; and receiving a handover request message from the another BS, wherein the handover request message includes a group membership state of a user equipment (UE).

17. The method of claim 16, wherein the CSG ID is included in the setup request message if an access mode of the BS is one of a closed mode or a hybrid mode.

18. The method of claim 16, wherein the CSG ID is used to determine whether to allow a handover between the BS and the another BS.

19. A base station (BS) in a mobile communication system, the BS comprising:

a communication unit configured to:
receive a setup request message from another BS, transmit a setup response message to the another BS, and receive a handover request message from the another BS, wherein the setup request message comprises a closed subscriber group (CSG) identifier (ID) and neighbor information of the another BS, wherein the setup response message comprises the CSG ID and neighbor information of the BS, and wherein the handover request message includes a group membership state of a user equipment (UE).

20. The BS of claim 19, wherein the CSG ID is included in the setup request message if an access mode of the BS is one of a closed mode or a hybrid mode.

21. The BS of claim 19, wherein the CSG ID is used to determine whether to allow a handover between the BS and the another BS.

22. A base station (BS) in a mobile communication system, the BS comprising:

a communication unit configured to:
transmit a setup request message from another BS, receive a setup response message to the another BS, and receive a handover request message from the another BS, wherein the setup request message comprises a closed subscriber group (CSG) identifier (ID) and neighbor information of the another BS, wherein the setup response message comprises the CSG ID and neighbor information of the BS, and wherein the handover request message includes a group membership state of a user equipment (UE).

23. The BS of claim 22, wherein the CSG ID is included in the setup request message if an access mode of the BS is one of a closed mode or a hybrid mode.

24. The BS of claim 22, wherein the CSG ID is used to determine whether to allow a handover between the BS and the another BS.

* * * * *